No. 838,862. PATENTED DEC. 18, 1906.
W. E. JONES.
MACHINE FOR HULLING PEAS AND BEANS.
APPLICATION FILED JULY 7, 1906.
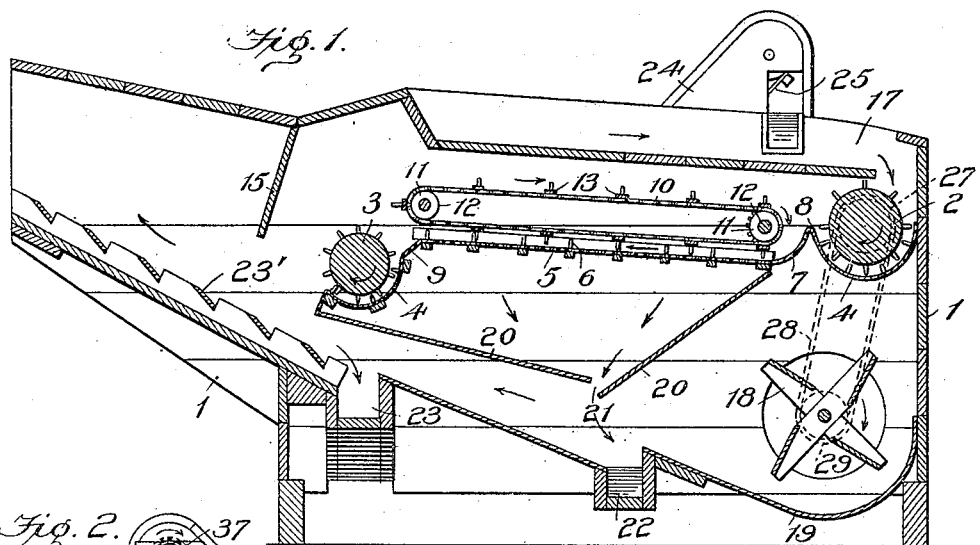
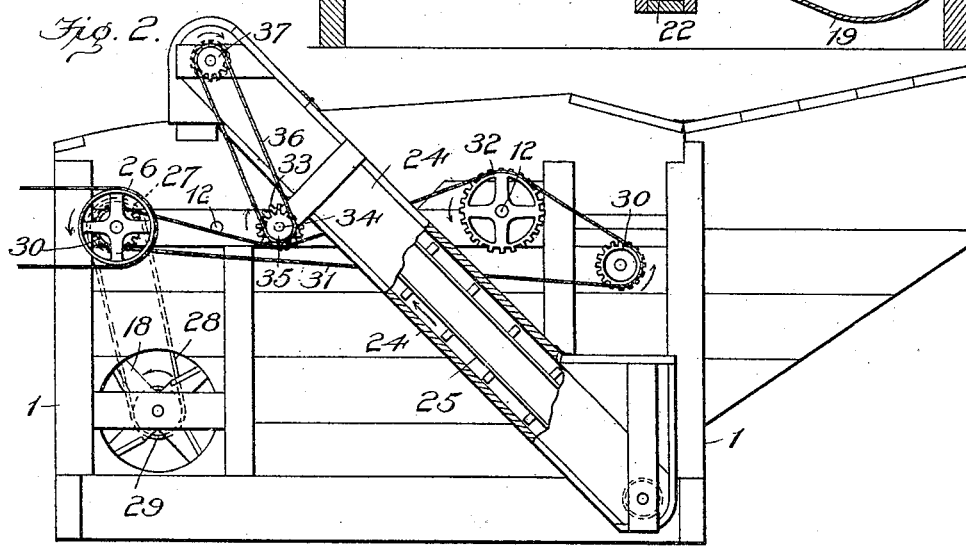
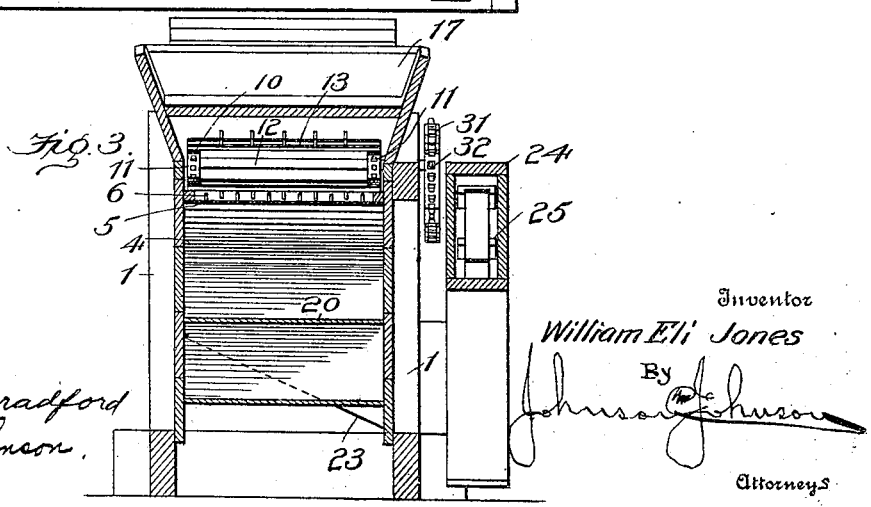
Witnesses
Edwin L. Bradford
Anne B. Johnson
Inventor
William Eli Jones
By Johnson & Johnson
Attorneys

UNITED STATES PATENT OFFICE.

WILLIAM ELI JONES, OF RUTHERFORD, TENNESSEE.

MACHINE FOR HULLING PEAS AND BEANS.

No. 838,862.          Specification of Letters Patent.          Patented Dec. 18, 1906.

Application filed July 7, 1906. Serial No. 325,161.

*To all whom it may concern:*

Be it known that I, WILLIAM ELI JONES, a citizen of the United States, residing at Rutherford, in the county of Gibson and State of Tennessee, have invented certain new and useful Improvements in Machines for Hulling Peas and Beans; and I do hereby declare the following to be a full, clear, and exact description of the invention, such as will enable others skilled in the art to which it appertains to make and use the same.

My invention is directed to improvements in the machine for hulling peas for which a patent was granted to me August 6, 1889, No 309,330; and the objects of my present improvements are to provide a remedy for certain defects in the construction and operation of my patented machine and which among other defects are that a considerable portion of the pods would fail to be fully broken and hulled and drift up over the dashboard of the secondary cylinder and choke the slatted flue at the end of the inclined separator and also choke the entrance into the elevator; that the inclined shaking-separator failed to effectively separate the peas from the broken pods; that the inclined separator in its movements in relation to the secondary threshing-cylinder caused the crushing and bruising of the peas, and that the operation of the separating-platform merely served as a carrier for the broken pods from one threshing-cylinder to the other without materially aiding in the separation of the peas. In my present machine these defects are overcome by the combination with the pair of threshing-cylinders, a toothed concave for each, a fixed toothed and perforated platform connecting each concave, and a toothed endless chain mounted to travel above the toothed perforated platform between the threshing-cylinders, whereby the pods are caused to be rolled and broken and the peas separated and delivered through the openings in the platform in their passage from one threshing-cylinder to the other. The traveling chain receives the broken pods from one cylinder and delivers them to the other to complete the separation therefrom of the peas.

In the accompanying drawings I have illustrated a machine for hulling peas embodying my improvements, in which—

Figure 1 is a vertical longitudinal section of said machine. Fig. 2 is a side elevation of the same, the elevator-closure being shown in partial section. Fig. 3 is a transverse section of the same.

Within a suitable frame 1 is mounted a pair of toothed cylinders 2 and 3 distant apart about half the length of the frame, the inner or secondary cylinder 3 preferably being a little lower than the receiving-cylinder. Each cylinder operates within a toothed concave 4, which are connected by a perforated platform 5, having teeth 6 and which receives the broken pods and peas from the primary cylinder and from which they are delivered into the concave of the second cylinder. This platform joins the front concave by an upward concave surface 7, making a transverse ridge 8, over which the threshed pods and peas are thrown by the cylinder from the concave upon the platform.

The concave of the inner cylinder joins the platform-surface in a slight upward incline 9, whereby the concaves, their connecting toothed and perforated platform, and toothed cylinders constitute a continuous toothed threshing and separating surface, and between the concaves the separated peas are delivered through the openings in the platform. For this purpose I provide an endless traveling toothed-chain device operating above the toothed platform and consisting of a pair of sprocket-chains 10, fitted upon sprocket-wheels 11 on shafts 12, mounted in the sides of the frame, the chains being connected by transverse toothed slats 13, so that the teeth will travel in close proximity to the toothed surface of the perforated platform free of contact with the teeth 6 thereof. This toothed-chain device will therefore seize the broken pods and the peas as they are thrown out of the front concave and carry them on the perforated platform, further breaking and hulling the pods by rolling and thrusting them against the fixed pins of the platform and deliver them into the inner or second concave, wherein they are further threshed and, together with the peas which fail to drop through the openings in the platform, are thrown out against a dashboard 15 into a wind-flue.

The cylinders are preferably of unequal diameter and have equal speed, while the endless toothed chain has a comparatively slow speed, which gives better results in treating the broken pods and the peas in forcing them over the toothed platform, in the separating and dropping of the peas through the openings in the platform, and lessens the injury to the peas in their travel over the platform.

The top of the machine forms an open hopper 17, the bottom of which extends a little in advance of a vertical central line of the front cylinder to about the inner end of the toothed chain to receive the pods and from which they are fed to the front cylinder. A fan 18 is mounted under the front cylinder in a casing, the bottom 19 of which inclines upward, and, with the boards 20, which incline toward each other from the under sides of the concaves, forms a wind-flue 21, which is extended beyond the inner concave to carry away the loose pod-pieces and particles and dust. The peas dropping from the perforated platform are delivered by the inclined boards into the wind-flue, the bottom of which at the mouth of the fan-casing opens into a side collecting-spout 22, which delivers the peas into a measure or receptacle. The extended portion of the wind-flue has a supplemental bottom of inclined slats 23', on which the broken pods and hull-pieces, with the peas that may be threshed out by the inner cylinder, fall, the lighter hull parts being blown out, while pieces of pods containing peas and the separated peas pass down between the slats into a side spout 23, which opens into an inclined elevator-closure 24, within which an elevator 25 is mounted to travel to carry up the pieces of pods and peas and deliver them into the hopper, to be again fed into the concave and thence upon the separating-platform.

The primary cylinder is driven by a power-driven pulley 26 on one end of its shaft, its other end having a pulley 27, from which a belt 28 leads to a pulley 29 on the fan-shaft to drive it. The shafts of each of the threshing-cylinders has a small sprocket-pulley 30, around which a sprocket-chain 31 passes to drive the cylinders in the same direction. A sprocket-pulley 32 on the shaft at the inner end of the endless separating-chain is engaged by the upper side of the sprocket-chain, which drives the threshing-cylinders, the pulley 32 of the endless separator being about twice the diameter of the pulleys on the cylinder-shafts, so that the speed of the endless separating-chain will be about half that of the cylinders, which gives a longer operation on the pods in passing over the fixed separating toothed platform. The elevator is operated by the upper side of the cylinder-operating chain engaging a small sprocket-pulley 33 on a short shaft 34, mounted at the under side of the elevator-closure, the outer end of said short shaft having a small sprocket-pulley 35, from which leads a sprocket-chain 36 to a small sprocket-pulley 37 on the upper end of the shaft of the elevator to drive it.

It is important to note that the front end of the endless toothed separator rotates in the concave end of the toothed perforated platform, and this relation causes the chain to catch and draw the broken pods down into the space between the fixed toothed platform and the toothed chain, while the inner end of the chain delivers the broken pods to the toothed cylinder, rendering it easy to draw freely then into the concave.

I claim—

1. In a machine for hulling and separating peas and beans, the combination with a pair of toothed threshing-cylinders and their toothed concaves, of a fixed toothed and perforated platform between and connecting the concaves, an endless toothed chain mounted above and parallel with said platform, and means for operating the cylinders and the chain.

2. In a machine for hulling and separating peas and beans, and in combination, a pair of toothed threshing-cylinders and their toothed concaves, a fixed toothed and perforated platform between and connecting the concaves, an endless toothed chain mounted above and parallel with said platform, means for rotating the cylinders and means for rotating the chain with a speed less than that of the cylinders.

3. In a machine for the purpose stated, a pair of rotating toothed threshing-cylinders and their toothed concaves, a fixed toothed and perforated platform having an upwardly-inclined surface concave connection with the edge of the front concave, and a downward incline connection with the edge of the inner concave, a rotating endless toothed chain mounted above and parallel with said platform and having a speed less than that of said cylinders.

In testimony whereof I have signed my name to this specification in the presence of two subscribing witnesses.

WILLIAM ELI JONES.

Witnesses:
H. W. WILLIAMS,
W. M. MOULDIN.